United States Patent [19]

Shrivastava et al.

[11] Patent Number: 5,754,757
[45] Date of Patent: May 19, 1998

[54] EFFICIENT SCHEMES FOR CONSTRUCTING RELIABLE COMPUTING NODES IN DISTRIBUTED SYSTEMS

[75] Inventors: Santosh Kumar Shrivastava; Neil Alexander Speirs; Sha Tao, all of Newcastle upon Tyne; Paul Devadoss Ezhilchelvan, Cramlingtonn; Francisco Vilar Brasileiro, Newcastle upon Tyne, all of Great Britain

[73] Assignee: The University of Newcastle Upon Tyne, Great Britain

[21] Appl. No.: 432,184

[22] PCT Filed: Oct. 28, 1993

[86] PCT No.: PCT/GB93/02225

§ 371 Date: Jun. 23, 1995

§ 102(e) Date: Jun. 23, 1995

[87] PCT Pub. No.: WO94/11820

PCT Pub. Date: May 26, 1994

[30] Foreign Application Priority Data

Nov. 6, 1992 [GB] United Kingdom ............... 9223323
Sep. 15, 1993 [GB] United Kingdom ............... 9319058

[51] Int. Cl.$^6$ ............................................. G06F 11/34
[52] U.S. Cl. ............................ 395/182.09; 371/36
[58] Field of Search ....................... 395/180, 181, 395/182.09, 182.1, 184.01, 185.01, 182.08; 371/36, 61; 364/268.1, 268.9, 269, 269.1

[56] References Cited

U.S. PATENT DOCUMENTS 4,356,546 10/1982 Whiteside et al. ............... 364/200
4,914,657 4/1990 Walter et al. ............... 364/200
5,023,779 6/1991 Federico et al. ............... 364/200
5,157,780 10/1992 Stewart et al. ............... 395/183.17
5,210,834 5/1993 Zurawski et al. ............... 364/200
5,285,381 2/1994 Iskarous et al. ............... 395/182.09
5,423,024 6/1995 Cheung ............... 395/182.09
5,428,769 6/1995 Glaser et al. ............... 364/200

FOREIGN PATENT DOCUMENTS 246218 11/1987 European Pat. Off. ........ G06F 11/18

Primary Examiner—Robert W. Beausoliel, Jr.
Assistant Examiner—Albert Decady
Attorney, Agent, or Firm—Galgano & Burke

[57] ABSTRACT

This invention relates to a computing system, a fail-silent node for use in a computing system and a method of organizing information so that a number of microprocessors in a computing node, which are arranged to receive messages from other components in the computing system and to process the received messages so as to transmit the results of this processing to other components in the system, compare the results of their processing and send nothing out from the node unless either all the microprocessors in the mode produce identical results or more than half of the microprocessors in the node produce identical results. This is achieved by manipulating the order in which messages are processed by each microprocessor so as to ensure that each microprocessor in the node receives the same messages, orders these same messages so that messages within each microprocessor are processed in the same order, thus ensuring, if all the microprocessors are functioning correctly, that the same results are produced.

11 Claims, 5 Drawing Sheets

Various delays for trials of 1000 message requests.

| Model/Delay (usecs) | Input | Waiting | Service | Output | Overall | Node |
|---|---|---|---|---|---|---|
| Unreplicated | 360 | 0 | 768 | 366 | 1,494 | 726 |
| Order | 10,250 | 6,339 | 982 | 4,598 | 16,009 | 15,027 |
| FIFO | 5,198 | 580 | 1,053 | 4,925 | 11,178 | 10,124 |
| L/F (Leader) | 833 | 0 | 767 | 5,251 | 6,852 | 6,085 |
| L/F (Follower) | 1,665 | 0 | 781 | 2,002 | 4,449 | 3,668 |

Fig. 6

EFFICIENT SCHEMES FOR CONSTRUCTING RELIABLE COMPUTING NODES IN DISTRIBUTED SYSTEMS

BACKGROUND OF THE INVENTION

1. Field of the Invention

The invention relates to a computing node in or for use in a computer processing system and particularly a fail-silent computing node.

2. Description of the Prior Art

It is known that replicating computer processing on different computer microprocessors provides a practical means of constructing computer systems capable of tolerating arbitrary computer processor failures. A computing node is composed of a number of conventional computer processors on which applications are replicated to achieve tolerance to failures. Computing nodes are connected via a network.

Typically, individual hardware components do not inherently fail by becoming silent rather their output is corrupted. For some devices, simple models of their correct behaviour exist and can thus be used as a checking means, eg, memory devices should output exactly the data that was originally input to them. In these cases, faults can easily be identified by the addition to the data of redundant information, eg, parity bits, which can be checked when the data is output. However, for complex devices, for which there is no simple correlation between their inputs and subsequent ouptputs, eg, microprocessors, the easiest error detection method of adding redundancy is to duplicate the device and compare the outputs of the two devices.

In typical existing implementations of a fail-silent node, a plurality of or duplicated microprocessors are closely coupled and run in micro-synchronisation. Each microprocessor is initialised to an identical state and then performs identical actions on identical data for each tick of the system clock. Hence on every clock cycle the data output by the component is identical. The principles underlying the node architectures can be explained by examining FIG. 1 which is a diagrammatic representation of a conventional fail-silent node. Since the data streams to be compared are in exact lock-step, a simple hardware comparator (cmp) can be used to check that the data streams are identical and to prevent any outputs once a discrepancy is detected. Although two replicas are actually running, because they are microsynchronised and compared by the dedicated hardware comparator, the application running is unaware of the replication and the comparisons undertaken. When this fail-silent technique is used, the correct and erroneous message sets sent over the network are distinguished by the fact that the only erroneous messages than can be sent are incomplete correct messages, since the occurrence of a fault during the transmission of a message can stop transmission within one clock tick. Such incomplete messages are easily identified by the receiver since they will contravene the lowest levels of network protocols.

Fail-silent nodes have been used widely, for example, in commercial transaction computer processing systems. Such nodes have been designed with the assistance of specialised comparator hardware and clock circuits. A common (reliable) clock source is used for driving a pair of processors that execute in lock-step, with the outputs compared by a (reliable) comparator; no output is produced, once a disagreement is detected by the comparator. Note that since only two microprocessors are used within a node to check on each other, the fail silent characteristics of a node can be guaranteed only if no more than one microprocessor within a node is faulty.

Intuitively, fail silent behaviour ought to mean that a node never generates an erroneous output, i.e., the node can only either generate correct outputs or remain silent. However, this is impossible to implement in practice since output messages take a finite time to transmit, and a fault may occur leading to an error during the transmission of a message. A definition of fail-silence must include the case where a message receiver rejects such erroneous messages. Thus a two-microprocessor node will be said to exhibit fail-silent behaviour in the following sense: the outputs produced by it (if any) are either valid messages or detectably invalid messages; this behaviour is guaranteed so long as no more than one microprocessor in the node fails.

The disadvantages of the above described fail-silent node is as follows;

Firstly, with this type of node every new microprocessor architecture is likely to require substantial design overheads. Secondly, tightly synchronised processors may not be resilient to transients which may affect the microprocessors in identical manner, commonly known as common mode transient failures. Thirdly there may be market resistance from customers to the use of these highly specialised and customised non-standard nodes and finally, lock-step synchronisation at very high clock speeds (50–100 MHZ) may well turn out to be difficult or impossible to achieve.

SUMMARY OF THE INVENTION

It follows from the above that there is a need to provide a fail-silent node which does not require the microprocessors to be synchronised in lock-step, rather, that the microprocessors are synchronised with one another only when sending or receiving information. The microprocessors of a node function to execute synchronisation and order protocols "to keep in step". We have achieved this by providing fail-silent nodes which have an ordering mechanism so that identical messages in identical order are selected for processing thus providing identical outputs. A node implemented according to the invention does not require dedicated clock or comparator circuits (the hardware signified by dotted lines in FIG. 1 can thus de dispensed with). Further advantages of the invention include the fact that technology upgrades are easier. This is because the principles behind the invention do not change thus the techniques can be easily ported to any pair of microprocessors; secondly because the replicated computations are loosely synchronised, the architecture is likely to be capable of detecting common mode transient failures. This is because transients are unlikely to affect the computations on the microprocessor pairs in an identical fashion.

According to a first aspect of the invention there is therefore provided a computing system comprising a computing node arranged to receive messages from other components in the system, to process received messages, and to transmit messages to other components in the system; the computing node comprising:

a) a plurality of microprocessors linked together and arranged to process received messages;

b) a means for ordering the messages to be processed such that similar messages in identical order are selected for processing such that similar messages in which then produce identical outputs; and c) means for computing the outputs produced by the microprocessors of the node and for controlling the output of the node so that nothing is output from the node unless all the microprocessors in the node give identical output, the node output then being the same as the identical outputs.

In an alternative embodiment of the invention the said means for comparing the outputs produced by the microprocessors of the node and for controlling the output of the node operates so that nothing is output from the node unless more than half of the number of microprocessors in the node give identical output, the node output then being the same as the identical outputs.

According to a second aspect of the invention there is provided a fail-silent node in or for use in a processing system comprising;

a plurality of microprocessors having interface means for enabling communications with other components in the system, such as for example, other nodes, and a link means to enable communication between said processors in said node, characterised in that; said microprocessors further include;

a) authentication means so that each microprocessor can confirm the integrity of any message it receives;

b) signature means so that each microprocessor can label a message with its own, preferably unique, signature;

c) ordering means so that each microprocessor can order authenticated messages in time-stamped order;

d) diffusion means so that each microprocessor can send messages to other microprocessors; and e) comparison and control means so that the outputs produced by each microprocessor can be compared; whereby similar messages are processed in identical order and the same outputs are produced by each microprocessor, so that nothing is output from the mode unless all the microprocessors in the node give an identical output, the node output then being then being the same as the identical outputs.

In an alternative embodiment of the invention the said means for comparing and controlling the outputs produced by the microprocessors of the node and for controlling the output of the node operates so that nothing is output from the node unless more than half of the number of microprocessors in the node give identical output, the node output then being the same as the identical outputs.

According to either aspect of the invention, the ordering means comprises the provisions of clock means within each microprocessor which clock means are synchronised such that a measurable difference between readings of clocks at any instant is represented by a maximum known constant. Preferably the clock means is a logical clock.

Alternatively, the ordering means comprises the designation of at least one microprocessor as;

a Leader microprocessor and at least another of said microprocessors is designated as a Follower microprocessor whereby the Leader receives messages from outside the node and sends said messages to the Follower such that the order in which requests are processed is dictated by the Leader microprocessor.

In this ideal embodiment the Leader processes the information and then sends the result of this processing to the Follower so that the Follower can compare this result with its own generated result. In the event that the two results are identical, the Follower is adapted to produce a multiple signed message which is transmitted through the system. In the event that the two outputs are not identical a multiple signed message is not produced. In addition, the Follower is provided with means which enables it to monitor messages received from outside the node whereby faults can be detected in the Leader.

Preferably still said comparison means of said computing system or said comparison and control means of fail-silent node compares incoming messages with those produced locally so that successful messages can be countersigned by the local microprocessor and the subsequently generated multiple signed message can be transmitted through the system. In the event that the comparison fails, multiple signed messages are not produced and thus such messages are not sent through the system.

Preferably said computing system or said fail-silent node includes receiving means which discards duplicate messages.

Preferably said computing system or said fail-silent node includes microprocessors which are adapted to receive said messages in parallel. This latter arrangement is not present in the aforementioned Leader/Follower arrangement.

According to a yet further aspect of the invention there is provided a method for ordering messages to be processed within a fail-silent computer node comprising:

a) receiving messages at a microprocessor;

b) authenticating said messages so as to confirm the integrity of same;

c) stamping said messages to be ordered with a time-stamp corresponding to a local clock reading at said microprocessor;

d) signing said messages;

e) diffusing either the signed, time-stamped message or a copy of this signed, time-stamped message via a link means to other microprocessors in the node;

f) ordering a plurality of signed, time-stamped messages in time-stamped order;

g) processing the ordered messages according to their time-stamped order;

h) signing the processed message output;

i) diffusing either this signed, processed output message or a copy of this signed, j) processed output message via a link means to other microprocessors in the node; and comparing the output messages in the node and, where a pre-determined number of said output messages are identical, releasing said output messages from said node.

In a preferred embodiment of the invention said pre-determined number equals a number equal to all the number of microprocessors in the node.

In an alternative embodiment of the invention said pre-determined number equals a number equal to more than half of said microprocessors in said node.

Preferably said messages are received as said microprocessors in a parallel manner.

The method of ordering involves a process of stabilisation whereby incoming messages are delayed for a pre-determined length of time before they are queued in the time-stamped order of messages.

In the Leader/Follower embodiment of the invention, the pre-determined length of time for which incoming messages are delayed in the Leader microprocessor equals 0.

In a preferred method, for a two microprocessor fail-silent node, the process of ordering or stabilisation involves;

a) diffusing messages according to a First In First Out policy;

b) receiving at time-stamped message with a time-stamp equal to T; and c) where T is greater than the local clock value, advancing the local clock to a time T+1 and stabilising all messages with a time-stamp less than or equal to T; or d) where T is less than or equal to the local clock value, stabilising all messages with a time-stamp less than or equal to T.

This preferred method enhances the efficiency of the computing system or node.

BRIEF DESCRIPTION OF THE DRAWINGS

An embodiment of the invention will now be described by way of example only with reference to the accompanying Figures wherein;

FIG. 6 is a table showing performance measures.

DETAILED DESCRIPTION OF THE PREFERRED EMBODIMENT

In this detailed description it is assumed that computer systems have been structured to include a number of computer microprocessors that interact only by way of messages. Messages are defined as data which is sent from one microprocessor to another. Further, it is assumed that computations performed by microprocessors are deterministic, that is to say, if all the correctly functioning replicas of a process have identical initial states then they will continue to produce identical responses to incoming messages provided the messages are processed in an identical order.

Figure 1:
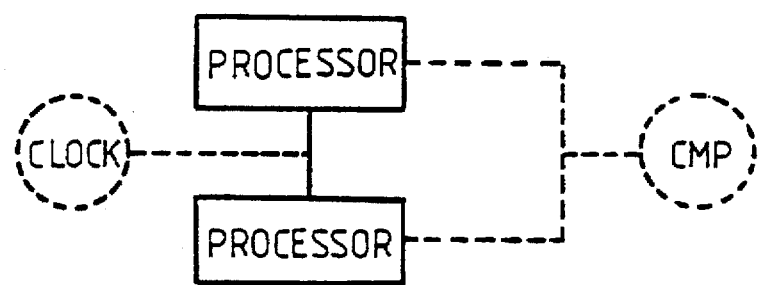
FIG. 1 represents a diagrammatic illustration of the prior art showing in phantom those components made obsolete by the present invention.
Figure 2:
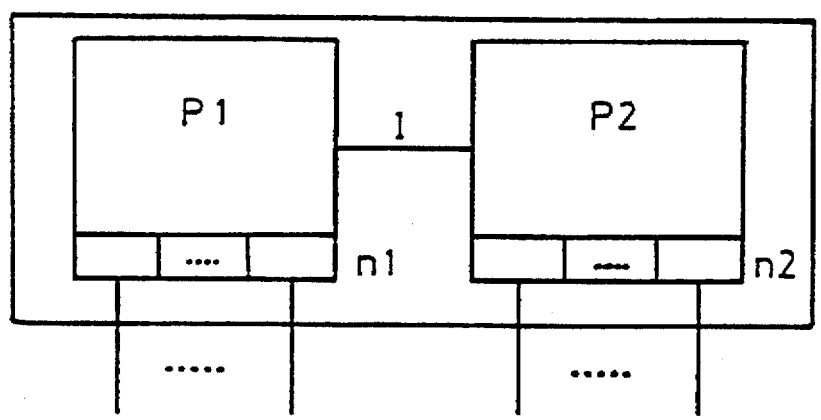
FIG. 2 represents a diagrammatic illustration of a fail-silent node in accordance with the invention.

The overall node architecture is shown in FIG. 2. Each of the two microprocessors ($P_1$, $P_2$) has network interfaces ($n_1$, $n_2$) for inter-node communication over (redundant) networks; in addition, the microprocessors are internally connected by a communication link, 1, or alternatively, the microprocessor may be linked by external means, for example by use of interfaces ($n_1$, $n_2$). Each non-faulty microprocessor in a node is assumed to be able to sign a message it sends by affixing the message with its (the microprocessor's) unforgeable signature; it is also assumed to be able to authenticate any received message, thereby detect any attempts to corrupt the message. For example, digital signature based techniques provide such functionality with extremely high probability.

It is necessary that the replicas of computational processes on microprocessors within a node select identical messages for processing, to ensure that they produce identical outputs. Identical message selection can be guaranteed by maintaining identical ordering of messages at input ports and ensuring that application processes pick up messages at the head of their respective input ports. An ordering mechanism is then required to ensure identical ordering if both the microprocessors are non-faulty.

Each non-faulty microprocessor, as shown in the FIG. 2 arrangement, of a node has the following mechanisms;

a) Diffusion: this takes the messages produced by the application process running on that microprocessor, signs them and sends them to the other microprocessor of the node for comparison.

b) Comparison: this authenticates all incoming messages from the neighbouring microprocessor; an authenticated message is compared with its counterpart produced locally. If the comparison succeeds, the authenticated message is countersigned and this doubly signed message is transmitted to destination nodes. A message that cannot be compared because its counterpart does not arrive or a comparison that detects a disagreement indicates a failure. Once a failure is indicated, the comparison mechanism stops. No further double signed messages are produced by the node.

c) Receiving: this accepts authentic messages for processing from the network, discarding any duplicates; such valid messages are sent to the local ordering mechanism.

d) Ordering: this mechanism negotiates with its counterpart in the other microprocessor and attempts to construct identical queues of valid messages for processing by the computation processes.

One known method of achieving ordering requires that the physical clocks of both the microprocessors of a node are synchronised such that the measurable difference between readings of clocks at any instant is bounded by a known constant.

Essentially, in the known method for ordering, the order process of a microprocessor stamps a message to be ordered with its local clock reading. A copy of the time-stamped message is signed and sent over the link to the order process of the other microprocessor in the node. If T is the time-stamp of the message received from or sent to the order process of the other microprocessor, then the message becomes stable at local clock time T+d+e where d is the maximum transmission time taken for a time-stamped message to travel from one order process to another order process over the link and e is the maximum difference between the clocks of the two microprocessors. A message with time-stamp T will be designated stable, if no message with another time-stamp <T will be received by an order process. Stable messages are queued at the relevant input ports in the increasing time-stamp order (with care taken not to queue a stable message, if its replica has already been queued).

The above operation ensures that the two following properties are met;

Agreement: all the non-faulty replicas of a process receive the same input messages;

Order: all the non-faulty replicas have identical input message queues or ordered message queues.

So, if all the non-faulty replicas of a process of a node have identical initial states and replicas always pick messages at the head of queues for processing then identical output messages will be produced by them.

Figure 3:
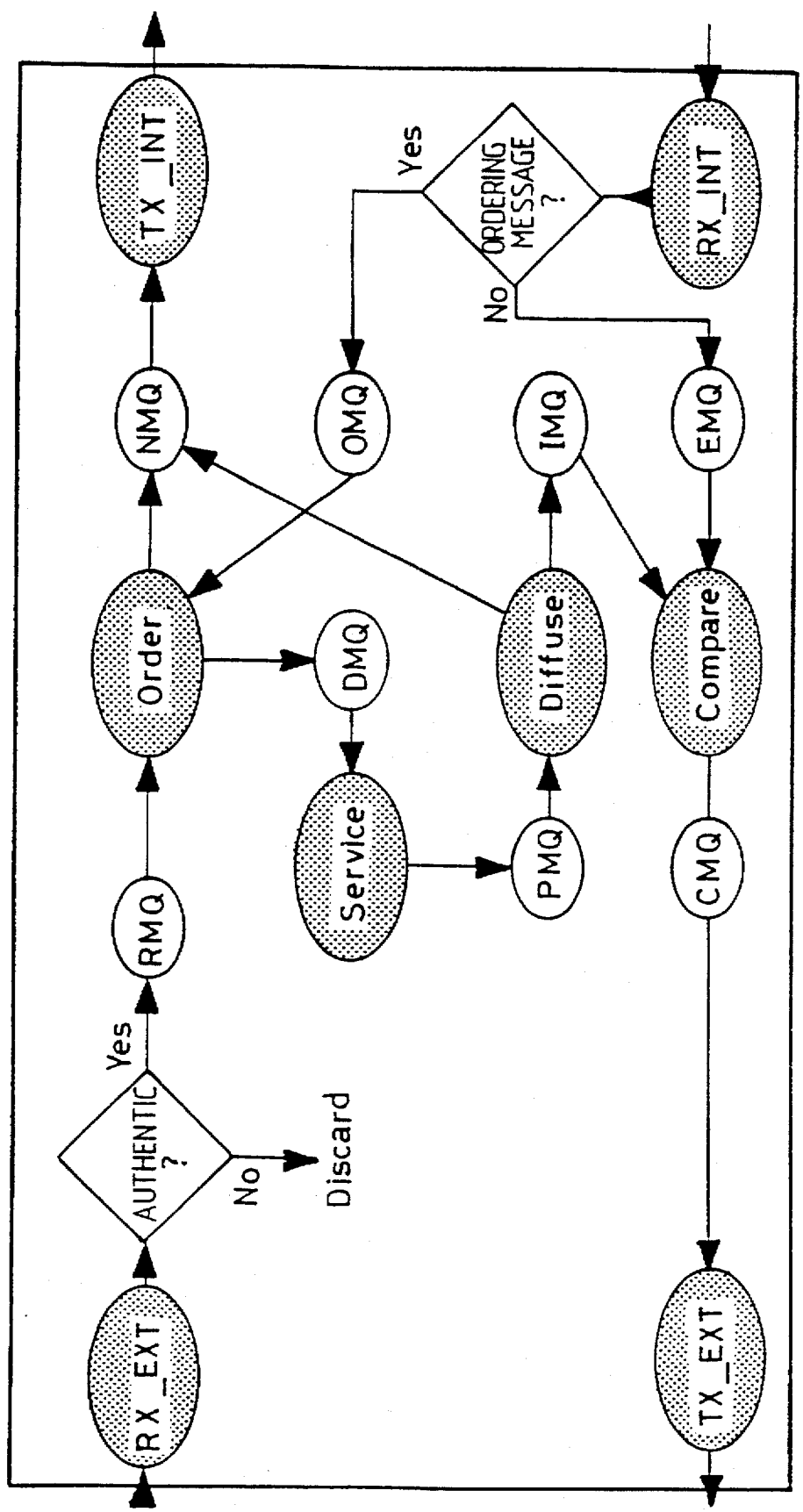
FIG. 3 represents a diagrammatic illustration of the operation of a fail-silent node in accordance with the invention.

We have developed a time-based ordering means for use in a fail-silent node which will now be explained with reference to FIG. 3. The detailed architecture of a node is depicted in FIG. 3, where the major components of the system within a microprocessor of a node and their interaction are summarised. The RX_INT and RX_EXT processes are responsible for receiving and authenticating messages from inside and outside the node respectively. An authentic message coming from outside a node will have two distinct signatures (for simplicity, the authentication of internal messages, received from the other microprocessor in the node, is omitted from FIG. 3). Similarly, the TX_INT and TX_ENT processes must send messages inside and outside the node respectively. The actual computing application is represented in FIG. 3 by the Service process. For the purpose of sending and receiving valid messages, each microprocessor maintains several message queues:

(i) Received Message Queue (RMQ): Contains valid received messages intended for ordering.

(ii) Processed Message Queue (PMQ): Contains unsigned output messages produced by computational processes. These messages must be validated: checked by the comparator before transmission to the final destination.

(iii) External Candidate Message Queue (EMQ): Contains singly signed messages that have been received for validation.

(iv) Internal Candidate Message Queue (IMQ): Contains unsigned messages, each waiting for a signal message with identical content to arrive in EMQ.

(v) Delivered Message Queue (DMQ): Contains ordered, signed messages to be delivered to the application process for processing.

(vi) Neighbouring Message Queue (NMQ): Contains signed messages to be relayed to the neighbouring microprocessor of the node. Messages could either be for ordering (from the order process) or for validation (from the diffuse process).

(vii) Compared Message Queue (CMQ): Contains doubly signed messages awaiting output.

(viii) Order Message Queue (OMQ): Contains messages relayed by the neighbour microprocessor for ordering.

A message received by RX_INT process could either be for validation, in which case it is deposited in EMQ, or for ordering, in which case it is deposited in OMQ.

The time-based ordering means has been improved so as to reduce the stability delay. It is of none that physical clocks are replaced by counters (logical clocks) which are no longer synchronised. The details are as follows.

Figure 5:
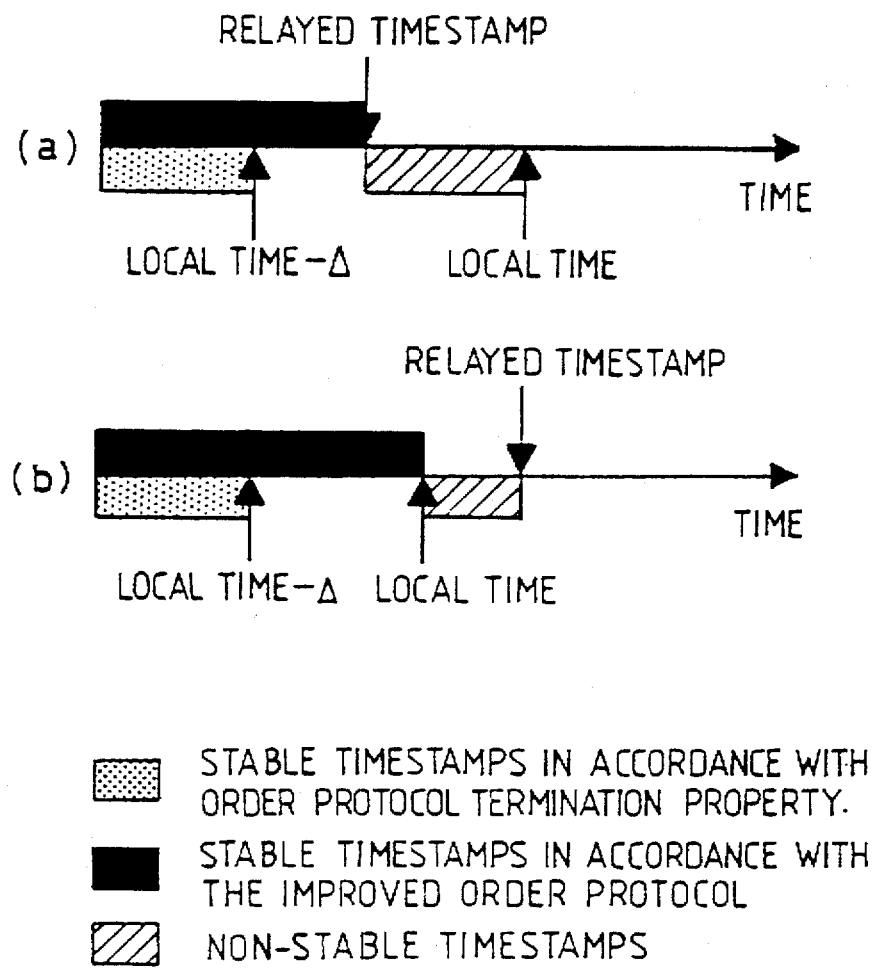
FIGS. 5(A–B) represent a diagrammatic illustration of an improved time-based ordering means.

The arrival of a relayed message in OMQ can be used to reduce the stability delay, d+e, as defined previously, imposed by ordering messages. As each microprocessor is unable to generate a time-stamp smaller than any order that it has previously generated, and messages are diffused (relayed) according to a First In First Out (FIFO) policy, the time-stamp of a message received defines intervals of time where messages can be stabilised earlier than the time d+e. FIG. 5 illustrates this improvement.

For instance, a message with time-stamp smaller than the local logical time is received. As no more messages will be received with time-stamps smaller than the time-stamp of this message (local time-stamps will be greater than the local time and remote messages will necessarily have time-stamps greater than that of the received message) all previously received messages, local or remote, with time-stamps smaller than or equal to the time-stamp of the diffused message are designated stable.

Alternatively, a message with time-stamp greater than the local time is received. In this case it is certain that no more messages will be received with time-stamp smaller than the local time, thus every previously received message with time-stamp smaller than or equal to the local time is stable. Further the local logical clock is advanced so as to exceed the time-stamp of the received message.

In the above, ordering means the two microprocessors operate symmetrically, that is to say, the microprocessors execute the same method. However, considerable performance improvements can be obtained by using an asymmetrical approach. We assign different roles for each of the microprocessors forming a node. We will term on the Leader and the other the Follower.

Figure 4:
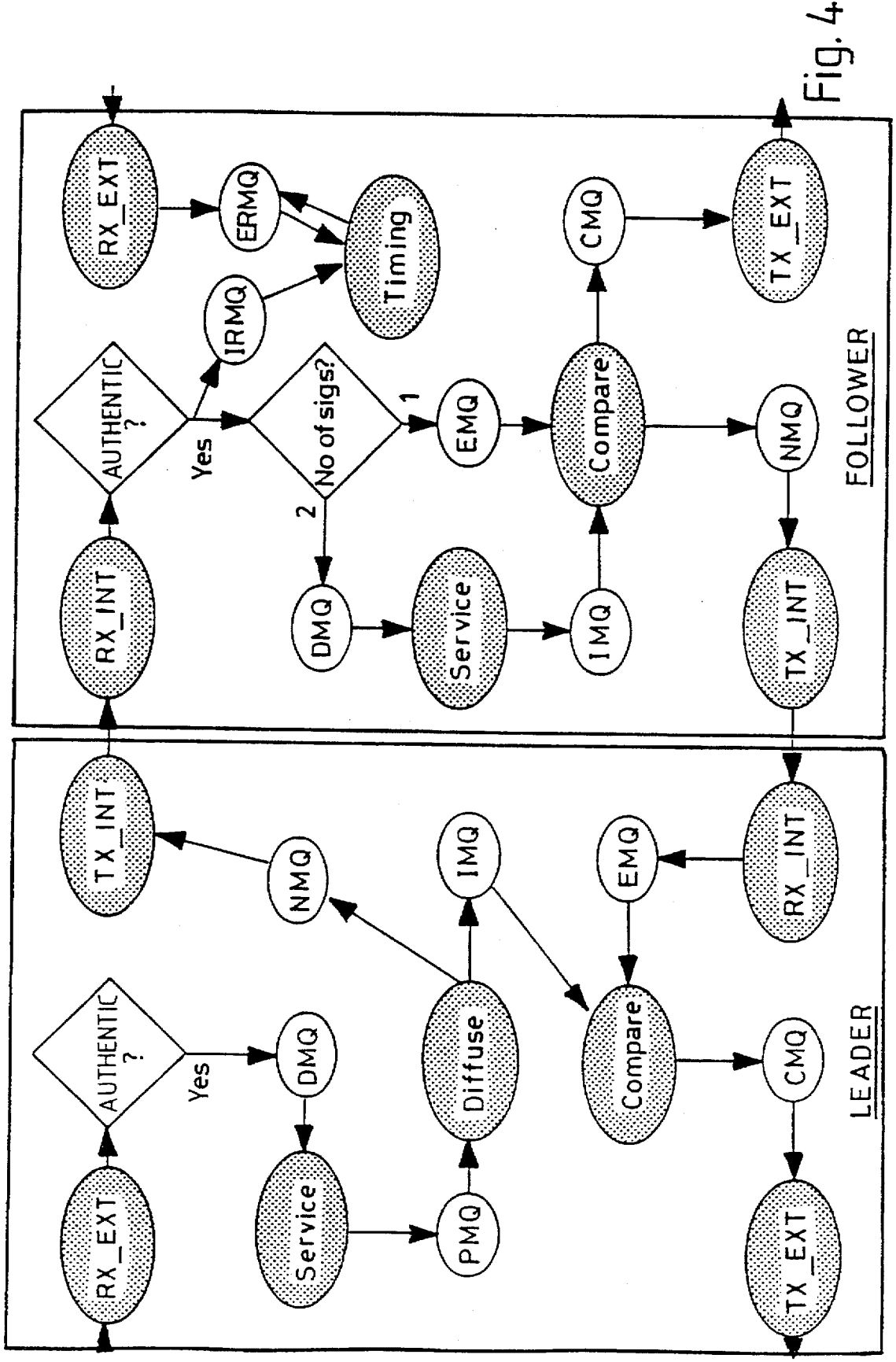
FIG. 4 represents a diagrammatic illustration of a preferred embodiment of a fail-silent node in accordance with the invention and particularly a Leader/Follower fail-silent node in accordance with the invention.

The order in which the requests will be processed in the node is dictated by the Leader microprocessor. The Leader selects one of the input messages for processing and sends a copy to the Follower. After transmission of this message to the Follower, the Leader processes the message, signs it and afterwards sends a copy of the output message to the Follower. Meanwhile the Followers receives the message, processes it and waits for the Leader's output message. The Follower then picks up the Leader's output message and compares it with its own. If the two messages agree, a double signed message is output, otherwise, the Follower microprocessor stops its activities and no double signed messages will be output. It is necessary to have communication in the Follower-Leader direction so that the Leader can detect faults in the Follower. Also, the Follower must monitor the messages received from outside (omitted for simplicity from FIG. 4) the node in order to detect faults occurring in the Leader. FIG. 4 shows the architecture for the Leader/Follower fail-silent node. The various processes and queues perform the same functions as described earlier in this section. In the Follower microprocessor, the number of signatures appended to a message received from the Leader determines its destination (EMQ or DMQ). Two signatures indicate the message is to be processed.

The Service, Diffuse and Compare processes work in almost the same way as in the normal fail-silent architecture. The Rx_Int and Tx_Int receive and transmit messages within the node. The Rx_Ext and Timing processes on the Follower are responsible for detecting omission and timing faults occurring in the Leader. In a correctly functioning system, both microprocessors will receive the same request messages from outside the node (although not necessarily in the same order). The Follower's Rx_Ext process receives each request from outside the node and deposits it in the External Received Message Queue (ERMQ) (if a copy of the message is already there, having been deposited by the Timing process, then the message time-out is reset) with an associated time-out. The Timing process picks up each message in the Internal Received Message Queue (IRMQ) and resets the time-out associated with its counterpart in the ERMQ (if its counterpart is not there, the message is placed in ERMQ with an associated time-out). If a time-out 'fires', the Follower assumed that the Leader has failed and ceases its own activities. As a result, no more double signed messages will be output. To solve the problem of detecting omission and timing failures in the Follower, it suffices to make the Follower end to the Leader the single signed messages that are supported to be output. After comparing this with its own output, the Leader will also output a double signed message. If the expected message does not arrive in a 'reasonable' time, the Leader will stop sending messages to the Follower, and so no more double signed messages will be output.

To calculate the time to process a request for this node, ti is necessary to analyse the activities in both microprocessors. As the activities in the Leader and Follower microprocessors are executed in parallel, we cannot simply add the times of the activities executed in each node. The Service processes are executed in both microprocessors in parallel. However, the Follower has to wait for the request message sent by the Leader before service can begin (the wait time is equal to $T_{diffuse}$). The Compare process in the Follower microprocessor has to wait for the local message produced by the Service process (in the Follower) and for the Leader's counterpart of this message. In general, if request messages and local response messages are sent by the Leader to the Follower through independent channels, it is likely that the Compare process will never have to wait for the neighbour's response message, as this message will be sent while the Follower is executing Service. More formally, the time that the Service process in the Follower will wait for the request message plus the time that the Compare process will wait for the neighbour's response message is equal to $T_{diffuse}$. This $T_{FS1f}$ is given by the following expression:

$$T_{FS1f} = T_{Rx-Ext} + T_{diffuse} + T_{service} + T_{compare} + T_{Tx-int}$$

and following the same approach of the previous section, we conclude that:

$$T_{FS1f} = T_{Non-Rep} + T_{diffuse} + T_{compare}$$

Since microprocessors in a fail-silent node must exchange at least one message per request (the message to be compared) the Leader/Follower soft fail-silent node has near optimal performance for a software implemented fail-silent node.

When discussing the Leader-Follower mechanism described above, it is necessary to examine the performance of both Leader and Follower since they are executing different protocols. The input delay in the Follower is defined to be the time between remove(m,Rx__Ext) at the Leader and remove(m,DMQ) at the Follower. Hence it reflects the time taken for the Leader to receive the message, relay it to the Follower and have the Follower remove it from DMQ. The output delays of Leader and Follower are significantly different. In the Follower, the output delays are smaller than in the Leader because the Leader begins to service the request before the Follower so that when the Follower is ready to compare its result, the Leader will have already send (or be sending) its response. If the comparison at the Follower is successful, the Follower outputs the compared message before passing its response to the Leader. Hence the output delay at the Leader reflects this additional time.

The experimental figures given in Table 1 indicate that adopting the Leader-Follower mechanism within a fail-silent node leads to a significant improvement in performance. The overhead of using soft fail-silent nodes is to produce a delay in response of approximately 3.7 ms in a lightly loaded system up to 6 ms when messages are constantly queued awaiting service. In either case, the performance of the Leader/Follower fail-silent node is considerably better than either of the fail-silent nodes employing an order protocol. If the application services involve lengthy computations then the percentage overhead involved in adding replication is extremely small. It is only when communication time between nodes outweighs computation time within nodes that the cost of replication becomes significant.

Modification of the invention to accommodate a fail-silent node including two or more microprocessors Fail-silent nodes stop issuing valid messages as soon as a fault is detected in the node. However, it is possible to build multi-microprocessor nodes which mask failures and continue to work in the presence of failures. An N failure masking node contains N microprocessors and continues to work provided not more than $f=(N-1)/2$ of these processors fail. Failure masking nodes also require an ordering mechanism for incoming messages. However, the performance of the ordering mechanism of failure masking nodes can be enhanced by applying an extension of the logical clock method as described above. The description of N failure masking nodes is more complex since the nodes must continue to work despite the presence of up to f arbitrary processor failures of a node. Below we describe the method:

Each non-faulty microprocessor $P_i$ in an N failure masking node maintains a logical clock $C_i$ which is first initialised to 1 when the node is started, and whose value will only increase with the passage of real time.

When microprocessor $P_i$ receives an authentic external message M (that is to say, a message with f+1 signatures), it composes an internal message comprising of the contents of M, a local logical time-stamp and the identity of the microprocessor (ie $P_i$). This composed message is deposited in a message pool called received$_i$ and $C_i$ is incremented by 1—this ensures that a non-faulty $P_i$ will prepare internal messages with increasing time-stamps. The message is then signed and sent to all other microprocessors in the node.

When microprocessor $P_i$ receives an authentic internal message m with s distinct signatures, $s \geq 1$, it deposits m in a pool received$_i$, if m is not already there; if m is a new message, $C_j$ is set to max $\{C_i, m.T+1\}$. Because of this operation a non-faulty $P_j$ will never prepare and send a different message m' with a time-stamp less than the original message after having received the original message. If the number of signatures does not exceed f, the received message is countersigned and sent to all other microprocessors in the node who have not signed m. The messages in received$_i$, which have time-stamps smaller than the smallest logical clock value in the node are stable and can be ordered according to their time-stamps.

A non-faulty microprocessor $P_i$ detects late messages using time-outs that are set-up as a result of receiving or sending messages. The principles behind setting these time-outs are as follows:

(i) suppose $P_i$ prepared and sends a message m to every other $P_j$ at its (physical) clock time t; after its clock time+d, every $P_j$ should have $C_j \geq m.T$ (time-stamp of m) and hence after its clock time t+2d, $P_i$ will not accept any different message m', with $m'.T \leq m.T$;

(ii) suppose that $P_i$ receives a message m at its clock time t; any non-faulty microprocessor $P_j$ that signed m, must have its $C_j > m.T$ at the time it sent m. Therefore, allowing d for possible message take-over during transmission, $P_i$ should not accept any single signed m' from any $P_j$ after its clock time t+d; and (iii) suppose that in case (ii), $P_i$ is a microprocessor that has not signed m. $P_i$ may receive m as late as t+d according to $P_i$'s clock. So $P_i$ must accept any single signed message m' from $P_j$ so long as its clock reads less than t+2d.

Similar time-outs for multiple signed messages can be derived, and careful analysis indicates that each additional signature in a message will increase the time-out for accepting that message by 2d. For example, (as in case (i)) $P_j$ after having prepared and sent m at its clock time t, should accept any new double-signed message m', with $m'.T \leq m.T$, whilst its clock reads less than t+4d. This complexity is necessary to prevent faulty microprocessors corrupting the ordered queues of correct microprocessors.

This scheme, unlike most ordering mechanisms, does not require that microprocessors' physical clocks are synchronised within a known bound. It provides an efficient mechanism for providing ordered message queues in an N failure masking node. In particular, for the special case, N=3 and f=1, the above technique can be optimised, resulting in a reduced ordering delay. Further optimisation still is possible when there are no microprocessor failures in the node and the communication time between two non-faulty microprocessors is much less than the estimated upper bound d. Since these conditions generally hold in practical systems, these optimisations give valuable performance enhancement to the node.

We claim:

1. A computing system comprising a computing node arranged to receive messages from other components in the system, to process received messages, and to transmit messages to other components in the system; the computing node comprising:
   a) a plurality of microprocessors linked together and arranged to process received messages;
   b) means for ordering the messages such that similar messages in identical order are selected for processing by correctly functioning microprocessors which then produce identical outputs, and further wherein said ordering means comprises a designation of at least one microprocessor as a Leader microprocessor and at least another of said microprocessors as a Follower microprocessor whereby the Leader receives messages from outside the node and sends said messages to the Follower such that the order in which messages are processed is dictated by the Leader microprocessor; and
   c) means for comparing the outputs produced by the microprocessors of the node for controlling the output of the node so that nothing is output from the node unless all the microprocessors in the node give identical output, the node output then being the same as the identical outputs.

2. A computing system according to claim 1 wherein said means for comparing the outputs produced by the microprocessors of the node and for controlling the output of the node operates so that nothing is output from the node unless more than half of the number of microprocessors in the node give identical output, the node output then being the same as the identical outputs.

3. A computing system according to claim 1 wherein the Leader is adapted to process the information and then sends the result of this processing to the Follower so that the Follower can compare this result with its own generated result and in the event that the two results are identical, the Follower is adapted to produce a multiple signed message which is transmitted through the system.

4. A computing system according to claim 1 wherein the Follower is provided with means which enables it to monitor messages received from outside the node whereby faults can be detected in the Leader.

5. A computing system according to claim 1 wherein said comparison means is adapted to compare incoming messages with those produced locally so that successful messages can be countersigned by the local microprocessor and a subsequently generated multiple signed message can be transmitted through the system.

6. A computing system according to claim 1 wherein said computing system includes receiving means which discard duplicate messages.

7. A method for ordering messages to be processed within a fail-silent computer node comprising:
   a) receiving messages at a microprocessor;
   b) authenticating said messages so as to confirm the integrity of same;
   c) stamping said messages to be ordered with a time-stamp corresponding to a local clock reading at said microprocessor;
   d) signing said messages;
   e) diffusing either the signed, time-stamped message or a copy of this signed, time-stamped message via a link means to other microprocessors in the node;
   f) ordering a plurality of signed, time-stamped messages in time-stamped order by designating one of said microprocessors as a Leader microprocessor and designating at least one other of said microprocessors as a Follower microprocessor, and arranging for the Leader to receive messages from outside the node and send said messages to the Follower such that the order in which messages are processed is dictated by the Leader microprocessor;
   g) processing the ordered messages according to their time-stamped order;
   h) signing the processed message output;
   i) diffusing either this signed, processed message output or a copy of this signed, processed message output via a link means to other microprocessors in the node; and
   j) comparing the message outputs in the node and, where a pre-determined number of said message outputs are the same, releasing said same message outputs from said node.

8. A method according to claim 7 wherein said predetermined number equals a number equal to all the number of microprocessors in the node.

9. A method according to claim 7 wherein said predetermined number equals a number equal to more than half of said microprocessors in said node.

10. A method according to claim 7 wherein the method of ordering involves a process of stabilization whereby incoming messages are delayed for a pre-determined length of time before they are queued in the time-stamped order of messages.

11. A method according to claim 10 wherein two microprocessors are provided in said node and the process of ordering or stabilization involves:
   a) diffusing messages according to a First In First Out policy;
   b) receiving a time-stamped message with a time-stamp equal to T; and
   c) where T is greater than the local clock value, advancing the local clock to a time T+1 and stabilizing all messages with a time-stamp less than or equal to T; or
   d) where T is less than or equal to the local clock value, stabilizing all messages with a time-stamp less than or equal to T.

* * * * *